United States Patent [19]

Airhart

[11] 4,073,362
[45] Feb. 14, 1978

[54] CHARGING AND IGNITION SYSTEM FOR GAS EXPLODERS

[75] Inventor: Tom P. Airhart, Plano, Tex.

[73] Assignee: Atlantic Richfield Company, Los Angeles, Calif.

[21] Appl. No.: 751,406

[22] Filed: Dec. 16, 1976

[51] Int. Cl.² ............................................. G01V 1/12
[52] U.S. Cl. ................................. 181/117; 181/107; 227/9
[58] Field of Search ................. 181/117, 118, 107; 227/9

[56] References Cited

U.S. PATENT DOCUMENTS

| 3,055,450 | 9/1962 | Richards | 181/118 |
| 3,338,330 | 8/1967 | Chatenever | 181/117 |
| 3,545,562 | 12/1970 | Gundlach | 181/117 |
| 3,620,327 | 11/1971 | Savit | 181/118 |
| 3,860,087 | 1/1975 | Silverman | 181/117 |

Primary Examiner—Howard A. Birmiel
Attorney, Agent, or Firm—Robert M. Betz

[57] ABSTRACT

Within a stationary, upstanding cylindrical housing, a piston and a base member resting on the ground are separated by an expansible detonation chamber. One or more gas inlets communicate with the chamber through which successive charges of a combustible gas mixture may be fed into the chamber at a rapid rate and thereafter ignited to initiate a corresponding series of gas explosions. Each gas inlet is connected to a main gas flow conduit which is supplied from at least two independent mixers through separate branching conduits. The mixers are supplied in rotation from sources of fuel gas and oxidizing gas so that only one branch conduit is in use at a time. Spark ignition occurs at each mixer in the same rotation. The branch conduits are connected to the main gas flow conduits in geometrical arrangements which prevent preignition even in long rapid fire shot sequences.

6 Claims, 7 Drawing Figures

CHARGING AND IGNITION SYSTEM FOR GAS EXPLODERS

BACKGROUND OF THE INVENTION

1. Field of the Invention

This invention relates generally to the field of seismic gas exploders adapted to rest on the earth and deliver multiple compressional pulses into the earth by operation in a cyclic fashion. The invention is more particularly concerned with exploders of this character which are operated at a high firing rate over a long sequence of shots.

2. Description of the Prior Art

Seismic gas exploders or as they are sometimes termed, seismic wave generators, broadly speaking include a detonation of combustion chamber having a rigid bottom and a rigid top telescopically joined in some fashion to permit relative vertical movement therebetween. Initiation of the explosion of a fuel gas and oxidizing gas combination within the combustion chamber produces the desired relative movement and applies a compressional pulse to the earth through the rigid bottom of the chamber.

Normally, fuel gas and oxygen from separate containers are mixed prior to being conducted into the detonation chamber in correct proportions by means of flow controlling solenoid valves interposed between the separate containers and the mixing point. Upon closing of the solenoid valves, the combustible gas mixture is ignited by a spark source located at the point of mixing. The resulting combustion accelerates into a detonation front within the inlet pipe or conduit leading to the exploder's detonation chamber.

The effects of heat generated by the chemical reaction involved in the burning and detonation of such a gas mixture do not of course dissipate immediately. If a gas exploder is fired repetitively at a rapid rate, one of the barrier problems is ignition of gases during fill prior to activation of the spark source, i.e., preignition. The higher the rate of fire, the sooner this limitation is manifested. In practicing modern seismic data acquisition techniques, it is desirable to be able to generate long pulse sequences, ranging, for example, up to 100 to 200 pulses. For this and other reasons, therefore, the problem of preignition has assumed greater importance.

Premature ignition may be the result of several factors including but not necessarily limited to: (1) residual heat stored in the walls of the exploder, inlet conduit or mixer-spark ignition assembly; (2) residual flame due to combustion chamber of gases not burned in the detonation front (to be distinguished from failure of solenoid valves to close completely, resulting in a sustained flame); (3) heat released by carbon in gas form converting to solid form; (4) glowing particles adhering to walls of the exploder and inlet, and (5) hot spots at localized points due to detonation and subsequent shock waves.

The prior art has recognized the existence of the preignition problem; but so far as Applicant is aware, it has assumed that among the factors mentioned above the main contribution has been the buildup of heat within the detonation chamber itself. Thus, for example, exhaust valving arrangements have been devised more efficiently to release the spent gases from the explosion. This approach has met with little success. Applicant has by contrast focused his attention outside the detonation chamber.

In approaching the preignition problem in a repetitively fired gas exploder, Applicant first considered that significant advantage might be achieved by reducing the frequency with which an individual gas inlet and its associated external conduit and mixer assembly were employed without reducing the firing rate. In copending application Ser. No. 751,407, entitled METHOD AND APPARATUS FOR GENERATING A LONG SEQUENCE OF SEISMIC PULSES filed concurrently herewith in the name of Tom P. Airhart, a method and apparatus is described which teaches the reasonableness of this assumption.

Applicant has continued to search for still further improvement in the charging and ignition systems utilized with gas exploders of the character described. The present application therefore deals with such further improvement.

SUMMARY OF THE INVENTION

It is therefore a general object of this invention to provide a gas exploder which may be repetitively operated in a more efficient manner.

It is a further object of this invention to provide a seismic gas exploder which may be fired continuously or for a long sequence at a rapid firing rate without suffering from preignition.

Other objects and advantages of this invention will become apparent from a consideration of the detailed description to follow and of the attached drawings and the claims appended hereto.

In a preferred embodiment the system of this invention comprises a seismic gas exploder having a rigid top and a rigid bottom in telescoping relation therewith resting on the earth so as to define an expansible detonation chamber therebetween. A charging and ignition system is provided including one or more spaced apart gas inlets penetrating the combustion chamber. Each such inlet is supplied by means of a main axial conduit. From each such main conduit there extend at least two branching conduits, interconnected respectively at their upstream ends with separate, independent mixers, each of which is in turn supplied from separate sources of fuel gas and oxidizing gas. In operation, by suitable flow control valves, the mixers are supplied in sequence with stoichiometric proportions of fuel and oxidizing gas. A combustible gas mixture therefore in turn flows from each mixer through its associated branching conduit into the main conduit and into the detonation chamber. Spark ignition is provided in each mixer in timed relation to the operation of the flow control valves, which establishes the exploder firing rate.

DESCRIPTION OF THE PREFERRED EMBODIMENTS

Figure 1:
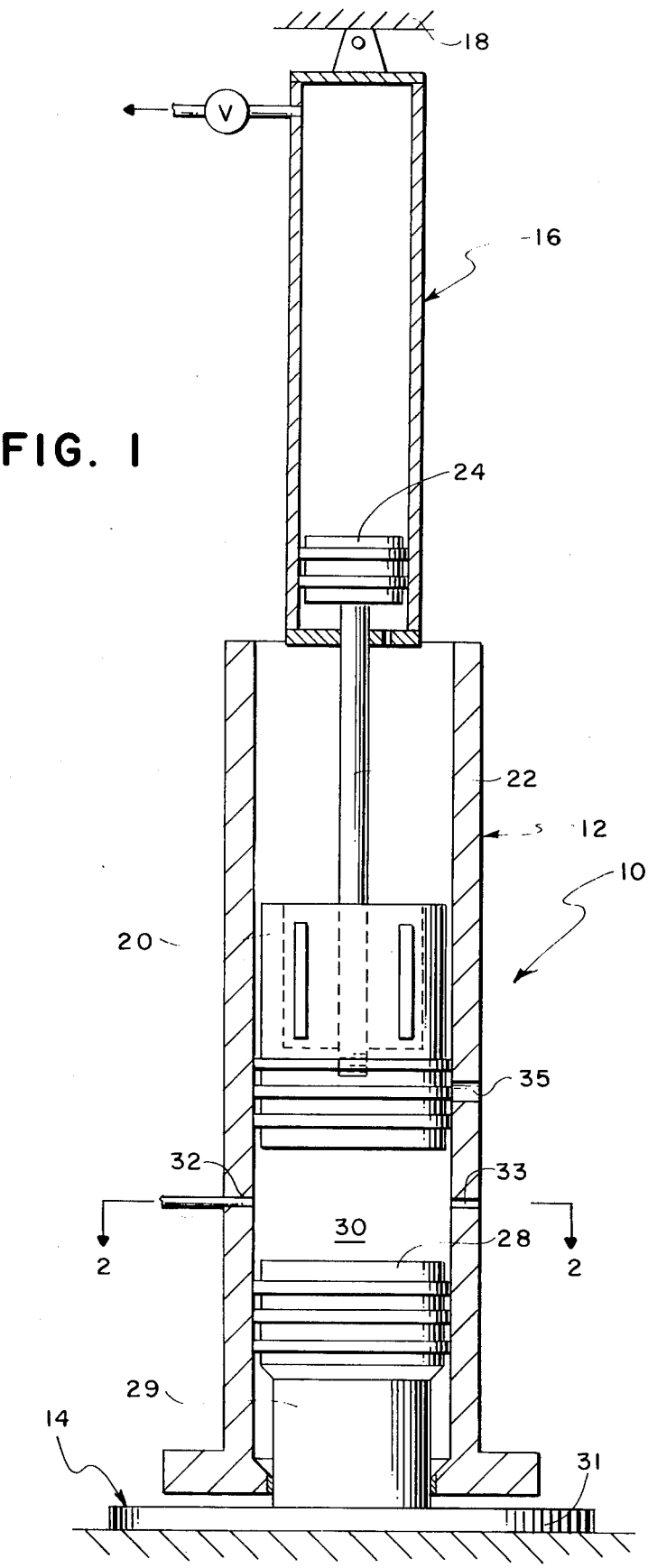
FIG. 1 shows a vertical section through a seismic gas exploder as utilized with the charging and ignition system of this invention.

With reference now to FIG. 1, there is shown a gas exploder 10, which may be generally any seismic gas exploder such as, for example, manufactured under the name DINOSEIS (a trademark of the Atlantic Richfield Company). Preferably, the invention will be described as utilized with an exploder of the type more particularly described in Applicant's copending application entitled FAST CYCLE SEISMIC GAS EXPLODER AND METHOD, Ser. No. 740,704, filed Nov. 11, 1976, in the name of Tom P. Airhart. The exploder 10 consists of a stationary upstanding cylindrical housing 12 assembled with a free base 14 (i.e., one that is movable vertically like a piston independent of the housing 12) in contact with the earth and an upper pneumatic recoil and recovery cylinder 16 suspended beneath a fixed overhead support 18, such as a truck body or a free standing framework. Within the cylindrical housing 12, a movable generator piston 20 is carried on a piston rod 22. A control piston 24 is movable within the upper cylinder 16 and is rigidly attached to the upper end of the piston rod 22.

The base 14 consists generally of a base piston 28, a connecting shank 29 and a bottom impact plate 31. The space between the generator piston 20 and the base piston 28 forms an expansible detonation chamber 30 which is provided with a fuel gas inlet 32 and a vent 33 penetrating the wall of the cylindrical housing 12. A larger exhaust port 35 penetrates the wall of the housing above the vent 33 and is exposed to the detonation chamber 30 only when the control piston 20 is driven sufficiently above its initial rest position.

Figure 2:
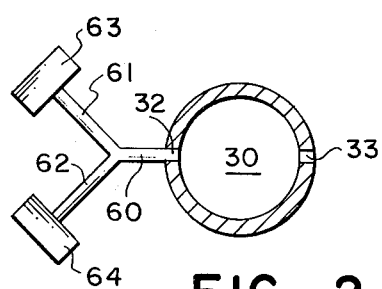
FIG. 2 is a view of a seismic gas exploder, partially in section taken along the line 2—2 in FIG. 1 and partially diagrammatic, illustrating a basic multiple mixer-common inlet charging and ignition system in accordance with this invention.

FIG. 2 shows an axial or main gas flow conduit 60, one end of which is connected to the inlet 32. The other end constitutes a junction point for two branching conduits 61 and 62 which extend into fluid contact with gas mixers 63 and 64. Those skilled in this art will appreciate that in the embodiment of this invention illustrated in FIG. 2 as well as other alternate embodiments of this charging and ignition system there are separate sources of fuel gas and oxygen together with suitable remotely controllable solenoid valves interconnected on the upstream side of each mixer. These components together with the proper controls for sequentially operating such valves at any desired rate are conventional and are therefore omitted for the sake of clarity and simplicity.

In operation a fuel gas and oxygen are provided alternately and repetitively to mixers 63 and 64 at the selected firing interval, there to be combined and passed along respective branch conduits 61 and 62 into common gas flow conduit 60. Thus, the mixture enters the detonation chamber 30 through inlet 32 in the form of separate charges at timed intervals. Ignition of each charge is initiated at the selected rate of fire within either of mixers 63 or 64, resulting in combustion and detonation fronts and propagating along the above-described paths. As each detonation front reaches the chamber 30, the base 14 transmits a compressional seismic impulse downward to the earth while the pistons 20 and 24 are simultaneously driven upwardly. As described in Applicant's copending application, Ser. No. 740,704, referenced above, the recoil recovery cylinder 18 insures a rapid return of piston 20 to its initial position. As piston 20 returns downwardly, a substantial portion of the spent gases within the chamber 30 are scavenged through the exhaust port 35. With the introduction of a succeeding charge of combustible fuel through the inlet 32, the bulk of the remaining spent gases in the chamber 30 are ejected through the vent 33 and the entire process is repeated.

Figure 3:
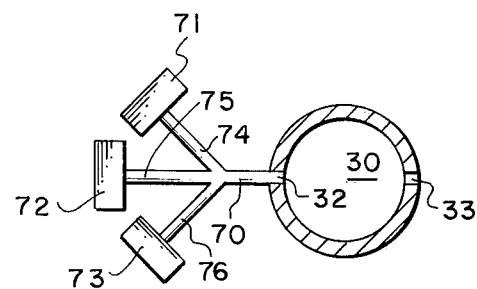
FIG. 3 is a view of a seismic gas exploder, partially in section taken along the line 2—2 in FIG. 1 and partially diagrammatic, showing an alternate multiple mixer-common inlet charging and ignition system in accordance with this invention.

In the alternate embodiment of FIG. 3, a charging and ignition system in accordance with this invention includes a main axial conduit 70 supplied from three individual mixers 71, 72 and 73 which are interconnected with main conduit 70 by three respective branching conduits 74, 75 and 76. As shown in Table 1 below, a seismic gas exploder repetitively operated by means of the charging and ignition system of FIG. 3 at a firing rate of 660 milliseconds per shot yields a total of 45 seismic pulses before preignition effects become apparent.

TABLE I

| No. Inlets | No. Mixers | No. Mixer Per Inlet | Firing Rate (MS) | Shots Per Inlet | Total Shots |
|---|---|---|---|---|---|
| 1 | 1 | 1 | 500 | 4 | 4 |
| 1 | 3 | 3 | 660 | 45 | 45 |
| 2 | 2 | 1 | 500 | 7 | 14 |
| 2 | 4 | 2,2 | 500 | 50 | 100 |
| 3 | 8 | 3,3,2 | 500 |  | 200 |
| 2 | 8 | 4,4 | 750 | 120 | 240 |

Figure 4:
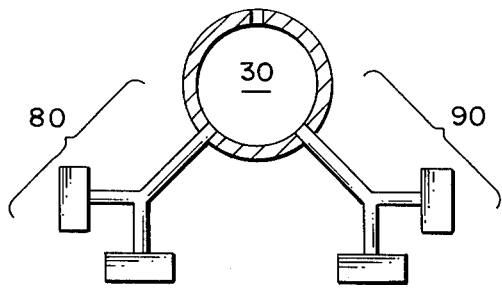
FIG. 4 is a view of a seismic gas exploder, partly in horizontal section and partly diagrammatic, in accordance with a still further alternate embodiment of this invention, illustrating multiple inlets.

A further alternate embodiment of the invention is set forth in FIG. 4. For simplicity sake, specific reference hereafter will not be made to the individual components of each mixer-inlet combination. In this embodiment, the mixer-inlet combinations 80 and 90 each comprise a pair of mixers for a total of four. With reference again to Table I, this type of charging and ignition system at a firing rate of 500 milliseconds per shot yields a total of 100 successful continuous shots.

Figure 5:
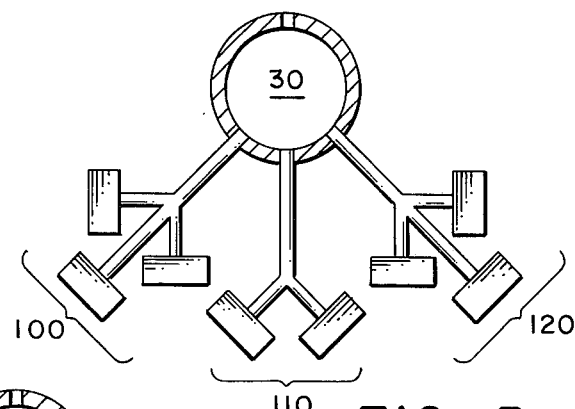
FIG. 5 is a view of a seismic gas exploder, partly in horizontal section and partly diagrammatic, in accordance with yet another embodiment of this invention, illustrating multiple inlets with differing numbers of branch gas conduits.

A still further alternate embodiment of the invention is depicted in FIG. 5. In this arrangement, three separate mixer-inlet combinations 100, 110 and 120 are employed. Of these combinations, 100 and 120 employ three mixers each and combination 110 employs two such mixers for a total of eight. Again with reference to Table I, this arrangement at an exploder firing rate of 500 milliseconds yields 200 successful consecutive shots.

Figure 6:
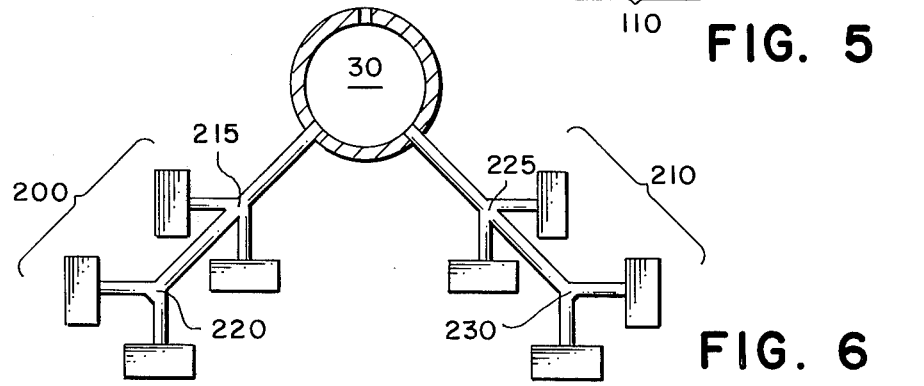
FIG. 6 is a view of a seismic gas exploder, partly in horizontal section and partly diagrammatic, of a yet further alternate embodiment of this invention, incorporating multiple mixers branching from a common inlet at different points.

In FIG. 6 mixer-inlet combinations 200 and 210 each include two pairs of mixers feeding a common inlet. Note that in combination 200 there are two separate conduit junction points 215 and 220. In like manner in combination 210 there are also two separate conduit junction points 225 and 230. Once again with reference to Table 1, this configuration utilized with a seismic exploder with a firing rate of approximately 750 milliseconds is found to yield 240 successful consecutive shots.

For comparative purposes, Table I also includes shot total results obtainable by rapid firing a gas exploder such as exploder 10 with one and with two gas inlets, each supplied by a single mixer. These data are reported in the above-reference application, Ser. No. 751,407, entitled METHOD AND APPARATUS FOR GENERATING A LONG SEQUENCE OF SEISMIC PULSES. Table I clearly demonstrates the improvement in shot totals attributable solely to the use of multiple mixers per inlet, without varying the number of inlets. In particular, doubling the number of mixers per inlet yields an increase factor of about 7 to 1, trebling yields an increase of about 11 to 1, and quadrupling yields an increase of about 17 to 1. It is apparent that with the aid of the geometrics of this invention there is no practical limit on the length of a shot sequence obtainable.

Figure 7:
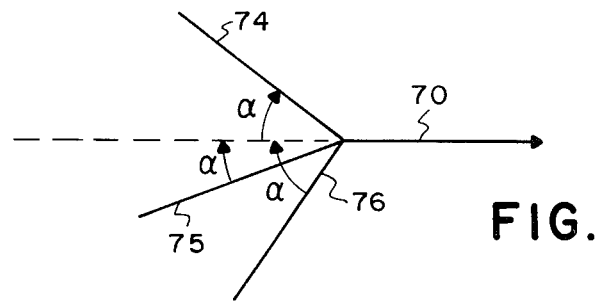
FIG. 7 is a diagrammatic illustration showing the angular relationship between branch gas conduits and a common axial gas conduit in accordance with this invention.

While the optimum angular relationship between individual branching conduits in these various embodiments and their common axial conduit is not fully understood, it seems apparent that there are limits. The diagram of FIG. 7 may be regarded as illustrating the angle $\alpha$ made in FIG. 3 between each of branching conduits 74, 75 and 76 and main axial conduit 70. Giving angle $\alpha$ a value of approximately 30° appears to have been successful.

The unexpected improvement in resistance of multiple gas mixer-spark ignition assemblies as described above to premature ignition is not thoroughly understood. It is believed however to be attributable in some manner to the high speed shock wave phenomena associated with the detonation wave and its subsequent reflections within the enclosed vessel of the detonation chamber and the gas inlet conduits. The geometrical arrangement of multiple mixer charging and ignition systems in accordance with this invention appears to develop more complex, primary and secondary shock waves than is the case with conventional systems.

For optimum results, consideration should be given to the internal angle between adjacent branching conduits. A good arrangement appears to be to position such branch conduits so that geometrically they lie on the surface of a cone whose axis constitutes the common axial conduit.

The use of this invention is not limited to the firing of a seismic gas exploder 10 having the particular configuration and operation described herein. Any such exploder which is adapted to repetitive operation may be operated to produce significantly longer or even continuous pulse sequences by modifying its charging and ignition system in accordance with this invention.

Although the invention has been described and illustrated with a certain degree of particularity, it is understood that the present disclosure is made by way of example only and that numerous changes in the details of construction and the combination and arrangement of parts may be resorted to without departing from the spirit and scope of this invention as hereinafter claimed.

The embodiments of the invention in which an exclusive property of privilege is claimed are defined as follows.

1. In a gas exploder including a housing having an expansible detonation chamber therein, a charging and ignition system comprising:
    (a) separate fuel gas and oxidizing gas supply means;
    (b) an external main gas flow conduit extending into communication with the interior of said detonation chamber;
    (c) at least two branch conduits defining separate gas flow paths interconnected with said main conduit externally of said detonation chamber;
    (d) at least two gas mixers, each connected to said fuel gas and oxidizing gas supply means and to the upstream end of a respective one of said branch conduits;
    (e) means for controlling the flow from said supply means to said mixers so that said mixers sequentially provide a combustible gas mixture to said main conduit through the downstream ends of their respective branch conduits; and
    (f) spark ignition means for separately igniting said combustible gas mixture adjacent said at least two gas mixers in timed relation to the operation of said mixers.

2. A system as in claim 1 wherein said at least two branch conduits are interconnected with said main conduit at a common point.

3. A system as in claim 1 wherein said at least two branch conduits are interconnected with said main conduit at separated points therealong.

4. A system as in claim 1 wherein said at least two branch conduits are each interconnected with said main conduit at an angle of approximately 30 degrees.

5. A system as in claim 1 wherein said at least two branch conduits are three in number.

6. In a seismic gas exploder system comprising an expansible detonation chamber, separate fuel gas and oxidizing gas supply means, at least one gas inlet communicating with the interior of said detonation chamber and an external gas flow conduit connected to said inlet, the method of repetitively firing said gas exploder comprising the steps of:
    (a) interconnecting a plurality of separate gas mixers with said gas flow conduit respectively through a like plurality of gas flow paths in timed sequence corresponding to a selected rate of fire; and
    (b) igniting the resultant combustible gas mixture at each of said mixers in the same sequence to cause said exploder to fire at said rate.

* * * * *